United States Patent
Iwata et al.

(10) Patent No.: US 7,074,844 B2
(45) Date of Patent: Jul. 11, 2006

(54) ADHESIVES

(75) Inventors: Ritsuo Iwata, Hamamatsu (JP);
Hironao Nagashima, Hamakita (JP);
Tomohide Ogata, Hamamatsu (JP);
Kazunari Suzuki, Hamamatsu (JP);
Koji Nakajima, Iwata (JP)

(73) Assignee: Yamaha Corporation, Shizuoka-Ken (JP)

( * ) Notice: Subject to any disclaimer, the term of this patent is extended or adjusted under 35 U.S.C. 154(b) by 319 days.

(21) Appl. No.: 10/437,899

(22) Filed: May 15, 2003

(65) Prior Publication Data

US 2003/0204010 A1  Oct. 30, 2003

Related U.S. Application Data

(63) Continuation-in-part of application No. 09/810,583, filed on Mar. 16, 2001, now abandoned.

(30) Foreign Application Priority Data

Mar. 17, 2000 (JP) ............... 2000-077047
Nov. 7, 2000 (JP) ............... 2000-339640
Feb. 6, 2001 (JP) ............... 2001-029525

(51) Int. Cl.
*C08L 97/00* (2006.01)
*C08L 29/04* (2006.01)
(52) U.S. Cl. ............... 524/14; 524/492; 524/591; 524/803; 428/425.1
(58) Field of Classification Search ............... 524/14, 524/591, 492, 803; 428/425.1
See application file for complete search history.

(56) References Cited

U.S. PATENT DOCUMENTS

| 5,141,968 | A | 8/1992 | Dietrich et al. |
| 5,468,783 | A | 11/1995 | Gebauer et al. |
| 5,587,117 | A | 12/1996 | Eisen et al. |
| 5,777,015 | A | 7/1998 | Jakob et al. |
| 5,880,183 | A | 3/1999 | Yeo |
| 6,313,335 | B1 * | 11/2001 | Roberts et al. ............ 556/419 |
| 6,316,573 | B1 | 11/2001 | Klauck et al. |

FOREIGN PATENT DOCUMENTS

| EP | 0367120 | 5/1990 |
| EP | 0 699 697 A1 | 3/1996 |
| GB | 1 423 558 | 2/1976 |
| JP | 51-30576 | 9/1976 |
| JP | 58-011576 | 1/1983 |
| JP | 59-152974 | 8/1984 |
| JP | 2000-226562 | 8/2000 |
| JP | 2001-49224 | 2/2001 |
| KR | 93-005542 | 6/1993 |

OTHER PUBLICATIONS

Copy of European Office Action dated Aug. 12, 2004.

* cited by examiner

*Primary Examiner*—Tae H. Yoon
(74) *Attorney, Agent, or Firm*—Dickstein, Shapiro, Morin & Oshinsky, LLP.

(57) ABSTRACT

An adhesive, comprising (A) a polymeric MDI, (B) modified polyvinyl acetate emulsion, (C) aqueous polyvinyl alcohol solution, and (D) a filler. Preferably, a mass ratio of A:B:C:D is 30:(60–160):(50–160):(10–140) provided that the aqueous polyvinyl alcohol solution (C) is in a concentration of 10% by mass.

33 Claims, 2 Drawing Sheets

ADHESIVES

This is a continuation-in-part of application Ser. No. 09/810,583, Mar. 16, 2001 now abandoned, the disclosure of which is hereby incorporated by reference.

BACKGROUND OF THE INVENTION

1. Field of the Invention

The present invention relates to adhesives for wood materials for use in bonding wood materials, the adhesives being high in initial bond strength at room temperature and excellent in durability after application, and to prevent generation of volatile organic compounds such as formaldehyde.

This application is based on patent applications (Japanese Patent Application No. 2000-77047, Japanese Patent Application No. 2000-339640 and Japanese Patent Application No. 2001-29525) filed in Japan, the content of which is incorporated herein by reference.

2. Description of the Related Art

As adhesives for woodwork, various adhesives such as urea resin based adhesives, melamine resin based adhesives, phenol resin based adhesives, resorcinol resin based adhesives, water based polymer-isocyanate adhesives, a-olefin based adhesives, and acetic acid vinyl emulsion based adhesives have heretofore been known.

However, use of such adhesives for woodwork is accompanied with various problems as described below. Urea resin based adhesives, melamine resin based adhesives, phenol resin based adhesives, resorcinol resin based adhesives and the like have a problem that a harmful substance such as formaldehyde could be generated during working or from the product. Water based polymer-isocyanate adhesives are relatively expensive, highly viscous and hence poor in workability, poor in initial bond strength, and easily foam.

a-Olefin based adhesives are relatively expensive and poor in adhesive strength at high temperatures. Polyvinyl acetate emulsion based adhesives are poor in water resistance and heat resistance.

As described above, the conventional adhesives for wood materials are excellent in one respect but poor in another respect. Few of them can satisfy the required properties within a wide range.

SUMMARY OF THE INVENTION

An object of the present invention is to provide an adhesive that quickly develops initial bond strength at room temperature without generating volatile harmful substances, has good heat resistance and water resistance and good durability, and is excellent in workability and less prone to foaming.

The above object can be achieved by an adhesive, comprising (A) a polymeric MDI, (B) modified polyvinyl acetate emulsion, (C) aqueous polyvinyl alcohol solution, and (D) a filler. Accordingly, the adhesive of the present invention can be used widely for bonding of wood materials including not only hard wood materials having a specific gravity of 0.6 or more, such as beech, oak, birch, maple, walnut, matoa, nato, and teak but also general wood and wood materials such as plywood, particleboard, MDF, and OSB.

DETAILED DESCRIPTION OF THE INVENTION

Hereinafter, the present invention will be described in detail.

As the polymeric MDI (Methylene Diphenyl Diisocyanate) (A), which serves as a main ingredient of the adhesive of the present invention, one having an isocyanate group content of from about 28% to about 35% and a viscosity of from about 100 to about 250 mPa·s (25° C.) is used.

As the modified polyvinyl acetate emulsion (B), modified polyvinyl acetate emulsion containing active functional group synthesized by emulsion polymerization and the like are used. Those having a resin content of from 40% to 65% and a viscosity of from 1,000 to 120,000 mPa·s (25° C.) are preferable. Also, those that are free of plasticizers are preferred.

The modified polyvinyl acetate emulsion (B) is added to increase room temperature initial bond strength, water resistance, and room temperature bond strength.

As the aqueous polyvinyl alcohol solution (C), a 10% by mass aqueous solution of partially saponified polyvinyl acetate is used and the degree of saponification is preferably from 85 to 92 mol %. This is used to adjust the initial bond strength and viscosity of the adhesive.

As the filler (D), ground granulated mineral slags, such as ground granulated blast—furnace slag prescribed in JIS A6206 (1997), waste slag (black sand) when smelting aluminum, waste slag (green sand) when smelting nickel, fine powder of calcium carbonate, magnesium oxide, aluminum oxide, titanium oxide, silica, or the like, having an average particle diameter of from 2 to 20 μm, or mixtures of these are used. Among them, the filler (D) is preferably at least one selected from the ground granulated mineral slag and silica. The filler role of preventing foaming and adjusting the viscosity. If ground granulated mineral slag or silica is used, additionally, heat resistance is increased. As the filler (D), a powder of organic materials such as a powder of fiberous plants, a powder of cereals, or the like, is also preferably used. Examples of the powder of organic materials include starch such as cornstarch, potato-starch, tapioca-starch or the like, walnut D plays a powder, wheat flour, coconut powder, rice husk (chaff), wood powder, a powder of animal materials such as glue powder, and gelatin powder. If the powder of organic materials is used as the filler (D), it is easy to cut the resulting wood products whose members are bonded with the adhesive and with less damage to edge of the cutting machine. The powder of organic materials is less detrimental to the working environment than a powder of inorganic materials. Further, a standard of management of the powder of organic material is low relatively. If necessary, a mildew resistant agent may be used with the powder of organic materials.

For the purpose of increasing the initial bond strength, the adhesive of the present invention may contain in addition to the above blended components, adhesive mass such as styrene butadiene rubber (SBR) emulsion, natural rubber (NR) emulsion, chloroprene rubber (CR) emulsion, acrylic emulsion, EVA emulsion or the like, or a viscosity increasing agent, also called a tackifier, such as rosin, hydrogenated rosin, coumarone resin, terpene resin, ester gum or the like. The bond strength may be increased by blending a silane coupling agent to increase interaction between the filler, an inorganic component, and any other organic component. The silane coupling agent is particularly effective when at least silica is used as the filler (D) and is blended in the range of from 0.01 to 0.4% by mass based on the mass of silica. With less than 0.01% by mass, the bond strength is not increased sufficiently while with the above 0.4% by mass, the viscosity of the adhesive might be too high to avoid a decrease in usability and storability.

The equivalent ratio of the above blended components (B+C)/A is preferably from 30 to 120, more preferably from 45 to 100. The equivalent ratio as used herein is calculated as described below.

The NCO equivalent number is calculated as follows. First the mass of polymeric MDI is multiplied by the NCO content (%) of polymeric MDI, the product is divided by 100 to obtain an NCO amount, and this is divided by NCO equivalent (42) to obtain an NCO equivalent number.

On the other hand, total amount of water contained in the modified polyvinyl acetate emulsion (B) and the aqueous polyvinyl alcohol solution (C) is obtained in the same manner as above. Since one molecule of water reacts with two NCO groups, the equivalent of water is 18/2=9. Dividing the total amount of water by the equivalent of water. 9. an OH equivalent number is obtained.

The OH equivalent number thus obtained further divided by the NCO equivalent number is an equivalent ratio.

If the equivalent ratio is less than 30, the room temperature bond strength is insufficient and also the initial bond strength is insufficient. If it exceeds 120, the viscosity becomes too high, the foaminess is high, and the heat resistance is decreased. The equivalent ratio is more preferably from 46 to 100. By setting the equivalent ratio (B+C)/A to from 46 to 100, the initial bond strength ("the initial 40 minutes"), which is defined as a value of compressive shear strength for the initial 40 minutes after press bonding at 22° C. and 60% RH, can be made 50×0.1 MPa or more (JIS K6852(1994)).

The blending ratio of the above-described blended components in terms of mass ratio is preferably polymeric MDI (A):modified polyvinyl acetate emulsion (B):aqueous polyvinyl alcohol solution (C):filler (D)=30:(60–160):(50–160): (10140).

When at least one selected from the ground granulated mineral slag and silica is used as the filler (D), the blending ratio is preferably 30:(70–160):(50–160):(50–140), more preferably 30:(100–150):(50–160):(80–140), provided that the concentration of the aqueous polyvinyl alcohol solution (C) is 10% by mass. By setting the blending ratio to 30:(100–150):(50–160):(80–140), the initial bond strength can be made 80×0.1 MPa or more.

When the powder of organic materials is used as the filler (D), the lending ratio is preferably 30:(60–160):(60–160): (10–40). By setting the blending ratio to the above range, the initial bond strength can be made 50×0.1 MPa or more.

If the blending amount of the modified polyvinyl acetate emulsion (B) is less than 60, the initial bond strength, water resistance, and room temperature bond strength are insufficient, while if it exceeds 160, water resistance and heat resistance are decreased.

If the blending amount of 10% by mass aqueous polyvinyl alcohol solution (C) is less than 50, the viscosity is increased, the workability is decreased, and the pot life is shortened. If it exceeds 160, the water resistance and heat resistance are decreased.

Further, if the blending amount of the filler (D) is less than 10, no sufficient foaming inhibitory power can be obtained so that heat resistance increasing effect cannot be obtained. If it exceeds 140, the viscosity is increased and the workability is decreased.

The adhesive of the present invention can be obtained by weighing the above-described respective blended components by predetermined amounts, and mixing and stirring them. The product contains water and is in the form of an aqueous paste. The viscosity of the composition is within the range from 1000 to 60,000 mPa·s (25° C.), preferably from 1000 to 45,000 mPas (25° C.). The pot life is 25 minutes or more, preferably 60 minutes or more. It is preferred that the blending ratio be set such that these conditions can be satisfied.

If the viscosity of the composition is less than 1000 mP·s (25° C.), the adhesive prone to soak into the wood materials and the bond strength is lowered.

The adhesive is cured by the reaction between the isocyanate groups in the polymeric MDI (A) and the moisture and other hydroxyl groups contained in the modified polyvinyl acetate emulsion (B) and the aqueous polyvinyl alcohol solution (C) to develop bond strength.

Such an adhesive quickly develops adhesiveness at room temperature so that sufficient bond strength can be obtained in a short time after press bonding. It produces less foam when mixing, stirring and bonding, has appropriate viscosity, and can be used for a long time, so that it has a good workability. Furthermore, it has high bond strength as well as high heat resistance and water resistance, so that it is excellent in durability.

Since the adhesive contains no formaldehyde condensation polymerized resin such as urea resin, phenol resin, melamine resin, or resorcinol resin, which is a source of formaldehyde, there is no risk that volatile harmful substances such as formaldehyde will be released from the product after bonding.

The adhesive of the present invention is excellent in various properties such as "Standard atmosphere", "Water resistance at 60° C.", "Temperature resistance at 100° C.", "The initial 40 minutes", and viscosity. In particular, if the equivalent ratio of components A:(B+C) is set to 1:(30–120), the adhesive exhibits the following bonding properties as will be apparent from the specific examples described hereinbelow.

| | |
|---|---|
| "Standard atmosphere": | 130 × 0.1 MPa or more |
| "Water resistance at 60° C.": | 40 × 0.1 MPa or more |
| "Temperature resistance at 100° C.": | 90 × 0.1 MPa or more |
| "The Initial 40 minutes": | 50 × 0.1 MPa or more |
| Viscosity | 1,000~60,000 mPa · s |

"Standard atmosphere" indicates values obtained by leaving test pieces to stand for 72 hours or more after press bonding them at 22° C. and 60% RH for 2 hours and measuring them as they are after the standing.

"Water Resistance at 60° C." indicates values obtained by dipping test pieces, which were left to stand at 22° C. and 60% RH for 72 hours or more after the press bonding, in water at 60° C. for 3 hours and then taking out and measuring the bond strength at room temperature (22° C.).

"Temperature resistance at 100° C." indicates values obtained by leaving test pieces, which were left to stand at 22° C. and 60% RH for 72 hours or more after the press bonding, to stand in an oven at 100° C. for 24 hours and measuring at a measuring temperature of 100° C.

"The initial 40 minutes" indicates values of compressive shear strength for the initial 40 minutes after press bonding at 22° C. and 60% RH.

Accordingly, the adhesive of the present invention can be used widely for bonding wood materials such as wood, plywood, particleboard, MDF (Medium Density Fiber board), and OSB (Oriented Strand Board). In particular, it can be used for lamination of hard wood materials having a specific gravity of 0.6 or more such as beech, oak, birch, maple, walnut, matoa, nato, and teak, lamination, decorative application, assembly of parts and the like of wood products such as musical instruments, adhesion of wood materials and another materials such as plastics, metals, glasses, ceramics.

The wood products of the present invention include various wood products bonded with the above-described adhesive, for example, musical instruments, furniture, construction materials, and the like and have high mechanical strength at the bonded parts and high durability.

EMBODIMENTS

Hereinafter, the present invention will be described in more detail by examples. However, the present invention should not be construed as being limited thereto.

26 types of adhesives having blending compositions (mass ratios) shown in Tables 1 to 4 were prepared and bonding tests were carried out using birch as an adherend.

As the polymeric MDI, the one prepared by Sumitomo Bayer Urethane Co., Ltd. was used. As the aqueous polyvinyl alcohol solution, 10% by mass solution of the one prepared by Unitika Corporation was used.

As the filler, ground granulated blast furnace slag (Esument Super 6000, average particle diameter: 8 μm, produced by Shin Nittetsu Chubu Esument Co., Ltd.), silica (Sibelite M3000, purity 99%, average particle diameter: 12 μm, produced by Sibelco Co., Ltd.), rice husk (SARON fiber AA type 200 mesh under, produced by SARON FILER LTD.) was used.

The bonding was performed by pressing under the conditions of coating amount of 190~200 g/m$^2$, temperature of 22~23° C., humidity of 55~60% RH, pressure of 5~7 kg/cm$^2$ for 2 hours.

The tests were performed in accordance with JIS K6852 (1994) "Testing methods for shear strength of adhesive bonds by compression loading". Also, the pot life and viscosity of the adhesives after the mixing and stirring were measured. The results of tests are shown in Table 5 and 6.

TABLE 1

|  | Test Example 1 | Test Example 2 | Test Example 3 | Test Example 4 | Test Example 5 |
|---|---|---|---|---|---|
| (A) Polymeric MDI | 30 | 30 | 30 | 30 | 30 |
| (B) Modified polyvinyl emulsion | 60 | 70 | 100 | 140 | 100 |
| (C) PVA 10% | 50 | 50 | 50 | 50 | 100 |
| (D) Ground granulated furnace slag | 80 | 50 | 120 | 120 | 100 |
| SBR Emulsion | 0 | 0 | 36 | 18 | 0 |
| Equivalent ratio | 36.94 | 39.41 | 46.80 | 56.65 | 68.96 |

TABLE 2

|  | Test Example 6 | Test Example 7 | Test Example 8 | Test Example 9 | Test Example 10 | Test Example 11 |
|---|---|---|---|---|---|---|
| (A) Polymeric MDI | 30 | 30 | 30 | 30 | 30 | 30 |
| (B) Modified polyvinyl emulsion | 140 | 100 | 150 | 150 | 30 | 200 |
| (C) PVA 10% | 100 | 150 | 140 | 160 | 30 | 180 |
| (D) Ground granulated furnace slag | 80 | 80 | 130 | 130 | 30 | 100 |
| SBR Emulsion | 36 | 18 | 0 | 0 | 0 | 0 |
| Equivalent ratio | 78.81 | 91.13 | 99.01 | 107.88 | 20.69 | 129.06 |

TABLE 3

|  | Test Example 12 | Test Example 13 | Test Example 14 | Test Example 15 | Test Example 16 | Test Example 17 | Test Example 18 |
|---|---|---|---|---|---|---|---|
| (A) Polymeric MDI | 30 | 30 | 30 | 30 | 30 | 30 | 30 |
| (B) Modified polyvinyl emulsion | 60 | 100 | 100 | 100 | 150 | 30 | 200 |
| (C) PVA 10% | 50 | 50 | 100 | 150 | 160 | 30 | 180 |

TABLE 3-continued

|  | Test Example 12 | Test Example 13 | Test Example 14 | Test Example 15 | Test Example 16 | Test Example 17 | Test Example 18 |
|---|---|---|---|---|---|---|---|
| (D) Silica | 80 | 120 | 100 | 80 | 130 | 30 | 100 |
| *Silane coupling agent | 0.1 | 0.1 | 0.1 | 0.1 | 0.1 | 0.1 | 0.1 |
| Equivalent ratio | 36.94 | 46.80 | 68.96 | 91.13 | 107.88 | 20.69 | 129.06 |

*In Table 3, the amount of silane coupling agent is based on silica.

TABLE 4

|  | Test Example 19 | Test Example 20 | Test Example 21 | Test Example 22 | Test Example 23 | Test Example 24 | Test Example 25 | Test Example 26 |
|---|---|---|---|---|---|---|---|---|
| (A) Polymeric MDI | 30 | 30 | 30 | 30 | 30 | 30 | 30 | 30 |
| (B) Modified polyvinyl emulsion | 84 | 78 | 64 | 100 | 156 | 145 | 101 | 126 |
| (C) PVA 10% | 67 | 93 | 113 | 100 | 85 | 100 | 155 | 155 |
| (D) Rice husk | 12 | 26 | 22 | 20 | 18 | 33 | 25 | 25 |
| Equivalent ratio | 50.32 | 60.40 | 65.80 | 68.96 | 76.11 | 80.08 | 93.25 | 99.44 |

TABLE 5

| | Basic Adhesion Properties Shear Strength of Adhesive Bonds by Compression Loading (*0.1 MPa) | | | | Workability | |
|---|---|---|---|---|---|---|
|  | Standard atmosphere | Water Resistance at 60° C. | Temperature resistance at 100° C. | Initial 40 minutes | Viscosity mPa·s (25° C.) | Pot Life Minutes (25° C.) |
| Standard Value | 130 or more | 40 or more | 90 or more | 50 or more | Less than 60,000 | 25 or more |
| Test Example 1 | 139 | 52 | 127 | 50 | 58,000 | 60 |
| Test Example 2 | 148 | 67 | 155 | 56 | 31,000 | 60 |
| Test Example 3 | 148 | 48 | 113 | 82 | 48,000 | 60 |
| Test Example 4 | 147 | 43 | 105 | 86 | 45,000 | 60 |
| Test Example 5 | 157 | 53 | 124 | 93 | 25,500 | 60 |
| Test Example 6 | 145 | 46 | 208 | 88 | 18,500 | 60 |
| Test Example 7 | 141 | 42 | 102 | 85 | 12,000 | 60 |
| Test Example 8 | 158 | 43 | 128 | 99 | 39,000 | 60 |
| Test Example 9 | 148 | 43 | 98 | 74 | 35,000 | 60 |
| Test Example 10 | 74 | 84 | 126 | 16 | 21,500 | 60 |
| Test Example 11 | 152 | 28 | 88 | 76 | 66,000 | 60 |
| Test Example 12 | 135 | 56 | 137 | 50 | 54,000 | 60 |
| Test Example 13 | 144 | 50 | 111 | 81 | 46,000 | 60 |
| Test Example 14 | 146 | 55 | 135 | 93 | 20,000 | 60 |
| Test Example 15 | 139 | 41 | 104 | 86 | 11,000 | 60 |
| Test Example 16 | 148 | 42 | 121 | 78 | 33,000 | 60 |
| Test Example 17 | 78 | 75 | 139 | 17 | 17,500 | 60 |
| Test Example 18 | 152 | 23 | 74 | 81 | 63,000 | 60 |
| Resorcinol | 172 | 103 | 131 | 0 | 1,500 | 30 |
| Urea | 143 | 86 | 127 | 0 | 3,000 | 30 |
| Aqueous polymer Isocyanate | 169 | 86 | 99 | 36 | 30,000 | 60 |
| α-Olefin | 158 | 32 | 65 | 55 | 45,000 | 90 |

TABLE 6

| | Basic Adhesion Properties Shear Strength of Adhesive Bonds by Compression Loading (*0.1 MPa) | | | | Workability | |
|---|---|---|---|---|---|---|
|  | Standard atmosphere | Water Resistance at 60° C. | Temperature resistance at 100° C. | Initial 40 minutes | Viscosity mPa·s (25° C.) | Pot Life Minutes (25° C.) |
| Standard Value | 130 or more | 40 or more | 90 or more | 50 or more | Less than 60,000 | 25 or more |
| Test Example 19 | 131 | 57 | 93 | 52 | 6,000 | 60 |
| Test Example 20 | 134 | 45 | 99 | 52 | 11,500 | 60 |
| Test Example 21 | 136 | 68 | 115 | 51 | 40,000 | 60 |
| Test Example 22 | 146 | 44 | 92 | 66 | 21,500 | 60 |

TABLE 6-continued

Basic Adhesion Properties
Shear Strength of Adhesive Bonds by Compression Loading
(*0.1 MPa)

| | Standard atmosphere | Water Resistance at 60° C. | Temperature resistance at 100° C. | Initial 40 minutes | Viscosity mPa · s (25° C.) | Pot Life Minutes (25° C.) |
|---|---|---|---|---|---|---|
| Test Example 23 | 143 | 49 | 91 | 54 | 12,000 | 60 |
| Test Example 24 | 161 | 43 | 94 | 57 | 32,500 | 60 |
| Test Example 25 | 132 | 45 | 91 | 55 | 18,750 | 60 |
| Test Example 26 | 135 | 45 | 107 | 54 | 30,000 | 60 |

In Tables 5 and 6, the meanings of "Water Resistance at 60° C.", "Temperature resistance at 100° C.", "The initial 40 minutes" and "Standard atmosphere" are mentioned above."

"Pot Life" indicates where adhesion properties are satisfied, at the maximum time that has passed after stirring.

Table 5 also shows the results of measurement on four conventional adhesives for wood materials for comparison.

From Table 5 and 6, it can be seen that among the adhesives of the test examples, those of Test Examples 4, 5, 6, 13, 14, 15 and 22 exhibit excellent properties.

Using the adhesive of Test Example 3 described above, a laminated wood was fabricated. Beechwoods of 100 mm in width, 600 mm in length and 25 mm in thickness were provided. An adhesive was coated on them in an amount of 200 g/m² for each adhesive layer and 8 beechwoods were superposed and press bonded under a load of 1.5 MPa at room temperature (22° C.) and 60% RH for 2 hours and then left to stand for 7 days. The resulting laminated wood was subjected to hot-cold cycle testing (by repeating 10 times the heat cycle of –20° C. for 16 hours and +50° C. for 8 hours) and to dry-wet cycle testing (repeating twice the cycle of 35° C., 95% RH for 2 days and 35° C., 20% RH for 5 days).

As a result, no separation of adhesive was observed so that lamination wood having good durability was obtained.

The adhesive of the present invention can also comprise (A) polymeric methylene diphenyl diisocyanate, (B) modified polyvinyl acetate emulsion, (C) aqueous polyvinyl alcohol solution, and (D) a filler; and (E) a defoaming agent. Addition of a defoaming agent suppresses foaming of the adhesive when components are mixed, and facilitates bursting of bubbles in the foam. Furthermore, addition of a defoaming agent also suppresses volume change in the adhesive over time; therefore, when the adhesive is applied, it stabilizes the amount of applied adhesive for a longer period of time, thereby improving workability. The kind of the defoaming agent is appropriately selected based on the intended use of the adhesive. Modified silicone resins (silicone resin plus foam-destroying polymer) are preferable, especially when the adhesive is applied in an large amount using a spreader. The amount of the defoaming agent is preferably 0.3 to 1.5 parts by weight per 100 parts by weight of the sum of the other ingredients. The adhesive with a defoaming agent added also shows an excellent bond strength.

Described below is an adhesive containing a defoaming agent.

TABLE A

| No. | Principal Ingredient of Defoaming Agent | Amount Added for Test 1 and Test 2 (parts by weight) |
|---|---|---|
| 1 | Melamine Resin | 0.1 |
| 2 | Toluene | 1.2 |
| 3 | Polydimethyl Siloxane | 0.8 |
| 4 | Alkylamine Polycarboxylate | 1.5 |
| 5 | Salt of a Long Chain Polyaminoamide and Polar Acid Ester | 0.8 |
| 6 | Sodium Salt of Acryl Copolymer | 1.5 |
| 7 | Alkylolamine Salt of Anionic and Nonionic Polyfunctional Polymer | 0.6 |
| 8 | Modified Polysiloxane Copolymer | 0.5 |
| 9 | Modified Silicone Resin | 1 |
| 10 | Unknown (Hydrophobic) | 0.5 |
| 11 | Unknown (Hydrophobic) | 0.5 |
| 12 | Unknown | 0.5 |

Test 1 (Test on Change in Volume Over Time)

Changes in volume due to foaming after mixing components were tested for the adhesives containing the defoaming agents shown in Table A. In this test, the result of the change in volume of the adhesive over time enables one to estimate not only the defoaming effect and the pot life, but also the applicability of the adhesive when using a spreader (i.e., whether or not the amount of the applied adhesive changes over time).

Method

To 100 parts of the sum of (A), (B), (C), and (D) of the Test Example 22 shown in Table 4, foaming agents in Table A was added in an amount also shown in the table, and was mixed by stirring, and was poured into a graduated cylinder, and then the volume of the mixture was measured after a predetermined period of time. Then, the defoaming effect of adding each defoaming agent was evaluated.

Test 2 (Test on Size and Ease of Bursting of the Bubbles)

The size and the ease of bursting of bubbles for the adhesives containing the defoaming agent were observed.

Method

To 100 parts of the sum of (A), (B), (C), and (D) of the Test Example 22 shown in Table 4, foaming agents in Table A were added in an amount also shown in Table A, and mixed. The size of generated bubbles were observed. Then, by stirring generated bubbles, the ease of burst of bubbles was evaluated.

Results of Test 1 and Test 2

The results are summarized in Table B. There were some differences seen in the volume change of each defoaming agent. The kind of defoaming agent used can be selected depending on the conditions under which the adhesive is applied (whether it is manually applied or is applied using a spreader, etc.), and characteristics of the volume change. In the case in which the adhesive is applied using a spreader, if the results are evaluated with the ease of bursting of bubbles in the foam being taken into consideration, the defoaming agent No. 9 (modified silicone resin) is excellent.

be applied in almost the same amount for a long period of time. This is suitable for applying an adhesive with a spreader. Addition of No. 9 defoaming agent in an amount of 0.3 to 1.5 parts is preferable, and addition in an amount of 0.5 to 1.0 parts is more preferable. If the defoaming agent is added in an amount exceeding 1.5 parts by weight, then the effect of reducing the change in volume of the applied adhesive can be maintained, but such a large amount of defoaming agent deteriorates the bonding strength of the adhesive, and increases cost of the production.

TABLE B

Results of Test 1 and Test 2

| Time (min) | Defoaming Agent | | | | | | | | | | | | |
|---|---|---|---|---|---|---|---|---|---|---|---|---|---|
| | None | No. 1 | No. 2 | No. 3 | No. 4 | No. 5 | No. 6 | No. 7 | No. 8 | No. 9 | No. 10 | No. 11 | No. 12 |

Test 1

| Volume Change (ml) | | | | | | | | | | | | | |
|---|---|---|---|---|---|---|---|---|---|---|---|---|---|
| 0 | 30 | 30 | 30 | 30 | 30 | 30 | 30 | 30 | 30 | 30 | 30 | 30 | 30 |
| 30 | 48 | 46 | 33 | 49 | 40 | 32 | 38 | 47 | 40 | 50 | 61 | 47 | 40 |
| 60 | 75 | 74 | 51 | 73 | 63 | 50 | 60 | 78 | 69 | 78 | 71 | 72 | 67 |
| 90 | 92 | 93 | 64 | 91 | 80 | 62 | 78 | 93 | 88 | 98 | 90 | 96 | 85 |
| 120 | 98 | 99 | 77 | 98 | 90 | 75 | 90 | 98 | 90 | 100 | 96 | 98 | 90 |
| Defoaming Effect | Bad | Bad | Fair | Bad | Bad | Fair | Bad | Bad | Bad | Bad | Bad | Bad | Bad |

Test 2

| | None | No. 1 | No. 2 | No. 3 | No. 4 | No. 5 | No. 6 | No. 7 | No. 8 | No. 9 | No. 10 | No. 11 | No. 12 |
|---|---|---|---|---|---|---|---|---|---|---|---|---|---|
| Size of Bubble | | | | | | Small | | | | Large | | | |
| Ease of Burst of Bubble | Bad | Good | Bad | Bad | Bad | Bad | Bad | Bad | Good | Excellent | Bad | Bad | Bad |

Test 3 (Test on Adhesive Applicability using a Spreader)

An adhesive spreading test using a spreader was conducted for the adhesives containing defoaming agents which showed good results in Test 1 or Test 2, containing toluene, and the adhesive not containing defoaming agent.

Method

Figure 2:
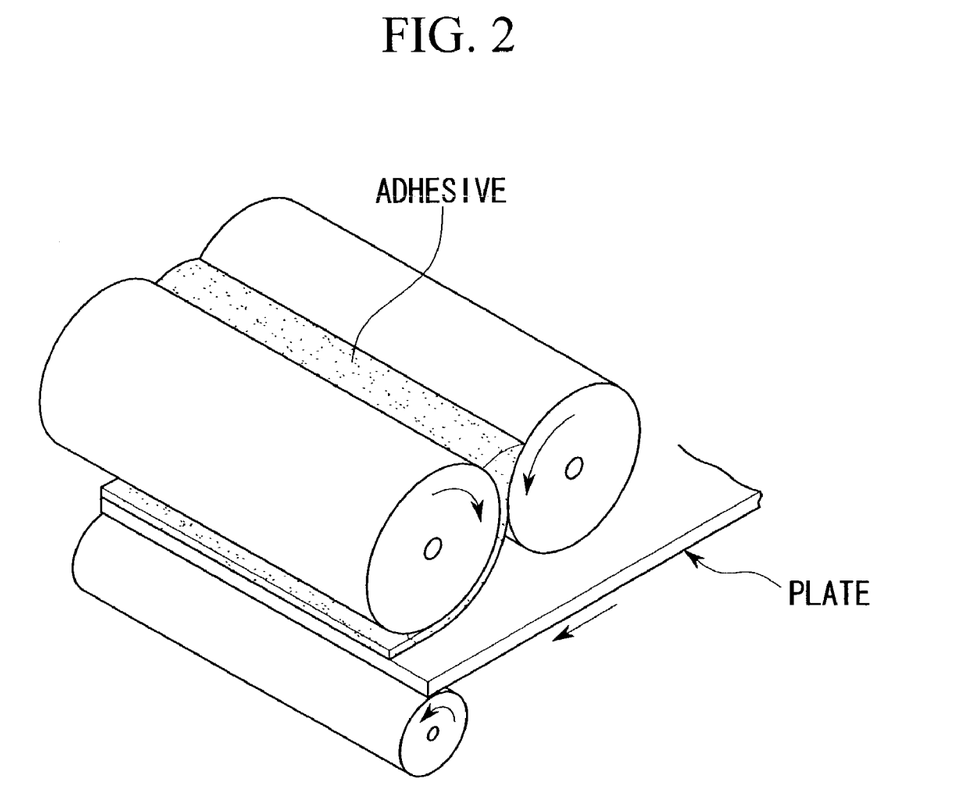
FIG. 2 shows a spreader that is used for the adhesive spreading test.

The adhesives containing a defoaming agent No.1, No. 2, No. 5, or No. 9 in Table A in an amount shown in Table C below to 100 parts of the sum of (A), (B), (C), and (D) of the Test Example 22 shown in Table 4, and an adhesive not containing any defoaming agent was used in this test. Each adhesive was charged into a spreader, it is applied to a plate, and then the amount (g/m²) of the applied adhesive was measured for each adhesive. After a predetermined period of time, the adhesive was applied to another plate, and the amount of the applied adhesive was measured. A spreader shown in FIG. 2 was used.

Figure 1:
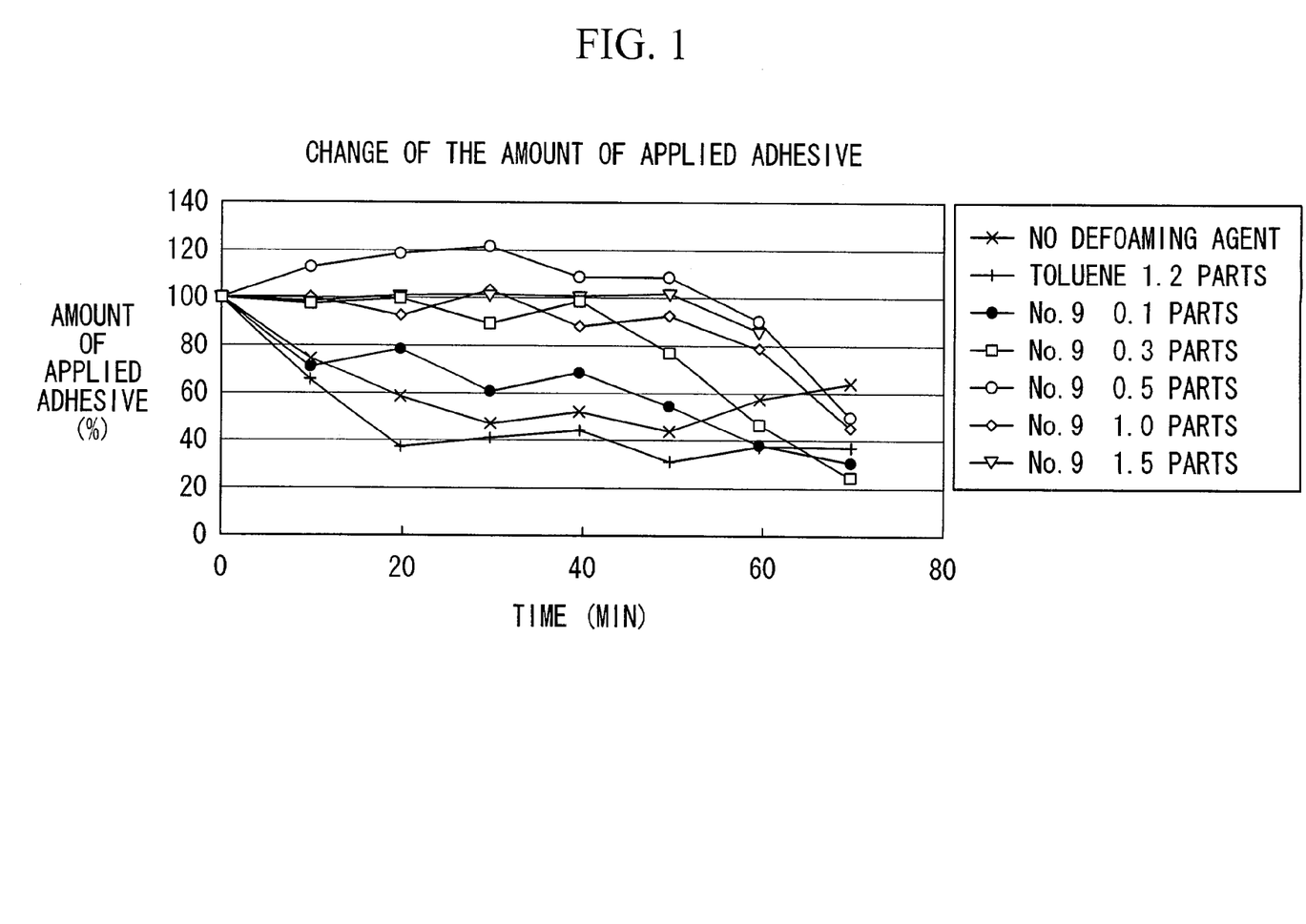
FIG. 1 is a graph showing the change in amount of the applied adhesive on the plate measured at 10-min intervals between 0 min and 70 min. The amount of the applied adhesive is expressed as a percentage of the amount of adhesive at 0 min.

The amount (g/m²) of the adhesive applied using a spreader measured at 0 to 70 min at 10 min intervals is shown in Table C. The relative amount of adhesive applied on the plate at each time interval is shown in Table C' and FIG. 1 The amount of the applied adhesive is expressed in % with the amount at 0 min set to 100%.

Result

When 0.3 to 1.5 parts by weight of No. 9 defoaming agent was added, the change in the amount of the applied adhesives over time was reduced. It means that the adhesive can

TABLE C

Amount of adhesive applied on a plate with spreader (g/m²)

| | | Defoaming Agent | | | | | | | |
|---|---|---|---|---|---|---|---|---|---|
| | | No. 1 | No. 2 | No. 5 | No. 9 | | | | |
| Time (min) | None | 0.1 parts | 1.2 parts | 0.8 parts | 0.1 parts | 0.3 parts | 0.5 parts | 1.0 part | 1.5 parts |
| 0 | 153.3 | 180 | 163 | 147.6 | 125.4 | 136.5 | 111.1 | 150.8 | 145.6 |
| 10 | 113.3 | 117.1 | 107 | 100 | 88.9 | 133.3 | 125.4 | 150.8 | 146.1 |
| 20 | 90 | 80 | 60 | 52.4 | 98.4 | 136.5 | 131.7 | 139.7 | 146.3 |
| 30 | 72.1 | 68.3 | 67 | 47.6 | 76.2 | 122.2 | 134.9 | 155.6 | 147.8 |
| 40 | 80 | 72.3 | 72 | 50.8 | 85.7 | 134.9 | 120.6 | 133.3 | 146.3 |
| 50 | 67.1 | 75 | 50 | 47.6 | 68.3 | 104.8 | 120.6 | 139.7 | 148.1 |
| 60 | 88.3 | 72.1 | 60 | 33.3 | 47.6 | 63.5 | 100 | 119 | 125.3 |
| 70 | 98.3 | 80 | 60 | 44.4 | 38.3 | 33.3 | 55 | 68.3 | 70 |

TABLE C'

Change in amount of applied adhesive (%) based on the amount at 0 min being set as 100%

| | | Defoaming Agent | | | | | | | |
|---|---|---|---|---|---|---|---|---|---|
| | | No. 1 | No. 2 | No. 5 | No. 9 | | | | |
| Time (min) | None | 0.1 parts | 1.2 parts | 0.8 parts | 0.1 parts | 0.3 parts | 0.5 parts | 1.0 part | 1.5 parts |
| 0 | 100 | 100 | 100 | 100 | 100 | 100 | 100 | 100 | 100 |
| 10 | 73.9 | 65.1 | 65.6 | 67.8 | 70.9 | 97.7 | 112.9 | 100.0 | 100.3 |

TABLE C'-continued

Change in amount of applied adhesive (%)based on the amount at 0 min being set as 100%

| | Defoaming Agent | | | | | | | |
|---|---|---|---|---|---|---|---|---|
| | No. 1 | No. 2 | No. 5 | | No. 9 | | | |
| Time (min) | None | 0.1 parts | 1.2 parts | 0.8 parts | 0.1 parts | 0.3 parts | 0.5 parts | 1.0 part | 1.5 parts |
| 20 | 58.7 | 44.4 | 36.8 | 35.5 | 78.5 | 100.0 | 118.5 | 92.6 | 100.5 |
| 30 | 47.0 | 37.9 | 41.1 | 32.2 | 60.8 | 89.5 | 121.4 | 103.2 | 101.5 |
| 40 | 52.2 | 40.2 | 44.2 | 34.4 | 68.3 | 98.8 | 108.6 | 88.4 | 100.5 |
| 50 | 43.8 | 41.7 | 30.7 | 32.2 | 54.5 | 76.8 | 108.6 | 92.6 | 101.7 |
| 60 | 57.6 | 40.1 | 36.8 | 22.6 | 38.0 | 46.5 | 90.0 | 78.9 | 86.1 |
| 70 | 64.1 | 44.4 | 36.8 | 30.1 | 30.5 | 24.4 | 49.5 | 45.3 | 48.1 |

The results of the tests 1 to 3 are summarized in Table D. When a defoaming agent is added to the adhesive, the kind of defoaming agent can be selected depending on the purpose of the adhesive, such as conditions under which the adhesive is applied (whether it is manually applied or is applied using a spreader, etc.), and the kind of adherend. In general, defoaming agents having a good foam suppression effect and a good foam bubble bursting effect are preferable. When the adhesive is used for applying soon after the components are mixed, such defoaming agents having a good foam suppression effect and/or a good foam burst effect may be suitable. Such a defoaming agent improves the workability in applying the adhesive. For mass production comprising an adhesive-applying step, stability in the applied amount of the adhesive over time is required; therefore, a defoaming agent having a good applicability with a spreader, is preferable (such as defoaming agent No. 9 (modified silicone resin)).

TABLE D

Results of Test 1, Test 2, and Test 3

| No. | Principal Ingredient of Defoaming Agent | Amount Added (parts by weight) | Defoaming Effect | Ease of Bursting of Bubble | Applicability with a Spreader |
|---|---|---|---|---|---|
| 1 | Melamine Resin | 0.1 | Bad | Good | Bad |
| 2 | Toluene | 1.2 | Fair | Bad | Bad |
| 3 | PolydimethylSiloxane | 0.8 | Bad | Bad | |
| 4 | Alkylamine Polycarboxylate | 1.5 | Bad | Bad | |
| 5 | Salt of a Long Chain Polyaminoamide and Polar Acid Ester | 0.8 | Fair | Bad | Bad |
| 6 | Sodium Salt of Acryl Copolymer | 1.5 | Bad | Bad | |
| 7 | Alkylolamine Salt of Anionic and Nonionic Polyfunctional Polymer | 0.6 | Bad | Bad | |
| 8 | Modified Polysiloxane Copolymer | 0.5 | Bad | Good | |
| 9 | Modified Silicone Resin* | 1 | Bad | Excellent | Good |
| 10 | Hydrophobic** | 0.5 | Bad | Bad | |
| 11 | Hydrophobic*** | 0.5 | Bad | Bad | |

*BYK-Chemie GmbH, Cat. #BYK-024 (solution type mixture of defoaming polymer and silicone resin)
*BYK-Chemie GmbH, Cat. #BYK-032 (emulsion type)
*BYK-Chemie GmbH, Cat. #BYK-033 (emulsion type)

Test 4 (Test of Bonding Strength and Viscosity)

To 100 parts of the sum of (A), (B), (C), and (D) of the Test Example 22 shown in Table 4, 1.0 part by weight of a defoaming agent No.9 in Table A was added. As an adherend, birch was used. The conditions for adhesion were: coating amount of 190–200 g/m², temperature of 22–23° C., humidity of 55–60 RH %, pressure of 2–7 kg/m² for 2 hours. The shear strengths of adhesive bonds of the "standard atmosphere", "temperature resistance at 100° C.", "water resistance at 60° C.", and "Initial 40 minutes" were measured according to JIS J6852, testing methods for shear strength of adhesive bonds by compression loading. The results are summarized in the following Table. The viscosity of the adhesive containing the defoaming agent was measured at 25° C.

Results

An excellent bond strength was obtained for the adhesive containing a defoaming agent.

| | Shear Strength of Adhesive Bonds by Compression Loading (×0.1 MPa) |
|---|---|
| Standard Atmosphere | 156 |
| Temperature Resistance at 100° C. | 39 |
| Water Resistance at 60° C. | 102 |
| Initial 40 Minutes | 63 |

The viscosity was 19500 mP·s (25° C.)

The adhesive to which a defoaming agent was added showed suppression of foaming, ease of bursting of bubbles in the foam, and better workability.

Furthermore, when the adhesive is applied using a spreader, the adhesive can be applied remaining stable for a longer period of time, and the workability when a large amount thereof is used improves. The adhesive with a defoaming agent added therein can maintain a excellent bond strength.

What is claimed is:

1. An adhesive consisting essentially of (A) polymeric methylene diphenyl diisocyanate, (B) modified polyvinyl acetate emulsion, (C) aqueous polyvinyl alcohol solution, (D) a filler, and (E) a defoaming agent of modified silicone resins; wherein a mass ratio of A:B:C:D is 30:(60–160):(50–160):(10–140) provided that the aqueous polyvinyl alcohol solution (C) is in a concentration of 10% by mass, and (E) is contained in a concentration of 0.3 to 1.5 parts by weight per 100 parts by weight of the sum of (A), (B), (C), and (D).

2. An adhesive according to claim 1, wherein the filler (D) is at least one selected from the group consisting of ground granulated mineral slag and silica.

3. An adhesive according to claim 1, wherein the filler (D) is a powder of organic materials.

4. An adhesive according to claim 2, wherein a mass ratio of A:B:C:D is 30:(70–160):(50–160):(50–140) provided that the aqueous polyvinyl alcohol solution (C) is in a concentration of 10% by mass.

5. An adhesive according to claim 3, wherein a mass ratio of A:B:C:D is 30:(60–160):(60–160):(10–40) provided that the aqueous polyvinyl alcohol solution (C) is in a concentration of 10% by mass.

6. An adhesive consisting essentially of (A) polymeric methylene diphenyl diisocyanate, (B) modified polyvinyl acetate emulsion, (C) aqueous polyvinyl alcohol solution, (D) a filler, and (E) a defoaming agent of modified silicone resins; wherein the polymeric methylene diphenyl diisocyanate (A) has an isocyanate group content of from 28% to 35% and a viscosity at 25° C. of from 100 to 250 mP·s; and wherein a mass ratio of A:B:C:D is 30:(60–160):(50–160):(10–140) provided that the aqueous polyvinyl alcohol solution (C) is in a concentration of 10% by mass, and (E) is contained in a concentration of 0.3 to 1.5 parts by weight per 100 parts by weight of the sum of (A), (B), (C), and (D).

7. An adhesive according to claim 6, wherein the filler (D) is at least one selected from the group consisting of ground granulated mineral slag and silica.

8. An adhesive according to claim 6, wherein the filler (D) is a powder of organic materials.

9. An adhesive according to claim 7, wherein a mass ratio of A:B:C:D is 30:(70–160):(50–160):(50–140) provided that the aqueous polyvinyl alcohol solution (C) is in a concentration of 10% by mass.

10. An adhesive according to claim 8, wherein a mass ratio of A:B:C:D is 30:(60–160):(60–160):(10–40) provided that the aqueous polyvinyl alcohol solution (C) is in a concentration of 10% by mass.

11. An adhesive according to claim 6 in the form of an aqueous paste having a viscosity of 1,000 to 60,000 mP·s (25° C.).

12. An adhesive according to claim 11, wherein the equivalent ratio of A:(B+C) is from 1:45 to 1:100; the mass ratio is 30:(100–150):(50–160):(80–140); and the aqueous paste has a viscosity of 1,000 to 45,000 mP·s (25° C.).

13. An adhesive according to claim 12, wherein the modified polyvinyl acetate emulsion (B) has a degree of saponification of from 85 to 92 mol %.

14. An adhesive consisting essentially of (A) polymeric methylene diphenyl diisocyanate, (B) modified polyvinyl acetate emulsion, (C) aqueous polyvinyl alcohol solution, and (D) a filler; wherein a mass ratio of A:B:C:D is 30:(64–156):(67–155):(12–33) provided that the aqueous polyvinyl alcohol solution (C) is in a concentration of 10% by mass.

15. An adhesive according to claim 14, wherein the filler (D) is at least one selected from the group consisting of ground granulated mineral slag and silica.

16. An adhesive according to claim 14, wherein the filler (D) is a powder of organic materials.

17. An adhesive according to claim 14, wherein a mass ratio of A:B:C:D is 30:100:100:20 provided that the aqueous polyvinyl alcohol solution (C) is in a concentration of 10% by mass.

18. An adhesive according to claim 14, further containing (E) a defoaming agent of modified silicone resins in a concentration of 0.3 to 1.5 parts by weight per 100 parts by weight of the sum of A, B, C, and D.

19. An adhesive consisting essentially of (A) polymeric methylene diphenyl diisocyanate, (B) modified polyvinyl acetate emulsion, (C) aqueous polyvinyl alcohol solution, and (D) a filler; wherein the polymeric methylene diphenyl diisocyanate (A) has an isocyanate group content of from 28% to 35% and a viscosity at 25° C. of from 100 to 250 mP·s; and wherein a mass ratio of A:B:C:D is 30:(64–156):(67–155):(12–33) provided that the aqueous polyvinyl alcohol solution (C) is in a concentration of 10% by mass.

20. An adhesive according to claim 19, wherein the filler (D) is at least one selected from the group consisting of ground granulated mineral slag, and silica.

21. An adhesive according to claim 19, wherein the filler (D) is a powder of organic materials.

22. An adhesive according to claim 20, wherein a mass ratio of A:B:C:D is 30:100:100:20 provided that the aqueous polyvinyl alcohol solution (C) is in a concentration of 10% by mass.

23. An adhesive according to claim 21, wherein a mass ratio of A:B:C:D is 30:100:100:20 provided that the aqueous polyvinyl alcohol solution (C) is in a concentration of 10% by mass.

24. An adhesive according to claim 23, in the form of an aqueous paste having a viscosity of 1,000 to 60,000 mP·s (25° C.).

25. An adhesive according to claim 24, wherein the aqueous paste has a viscosity of 1,000 to 45,000 mP·s (25° C.).

26. An adhesive according to claim 25, wherein the modified polyvinyl alcohol (B) has a degree of saponification of from 85 to 92 mol %.

27. Wood products whose members are bonded with an adhesive according to claim 1.

28. Wood products whose members are bonded with an adhesive according to claim 6.

29. Wood products whose members are bonded with an adhesive according to claim 12.

30. Wood products whose members are bonded with an adhesive according to claim 19.

31. An adhesive according to claim 19, further containing (E) a defoaming agent of modified silicone resins in a concentration of 0.3 to 1.5 parts by weight per 100 parts by weight of the sum of (A), (B), (C), and (D).

32. The adhesive of claim 14, wherein the filler (D) is rice husk.

33. The adhesive of claim 19 further comprising (E) a defoaming agent of modified silicon resins in a concentration of 0.3 to 1.5 parts by weight per 100 parts by weight of the sum of (A), (B), (C), and (D), wherein (D) is a rice husk.

* * * * *